United States Patent [19]
Dahod et al.

[11] Patent Number: 5,682,383
[45] Date of Patent: Oct. 28, 1997

[54] RECONFIGURABLE SWITCH MATRIX FOR LOCAL AREA NETWORK

[75] Inventors: Ashraf Mansur Dahod, Andover, Mass.; Erick R. Diaz, St. James, N.Y.; Camillo Iadevaia, Commack, N.Y.; Ronald Sulyma, St. James, N.Y.; Colin Michael Taddonio, Medford, N.Y.

[73] Assignee: Standard Microsystems Corporation, Hauppauge, N.Y.

[21] Appl. No.: 762,299

[22] Filed: Dec. 9, 1996

Related U.S. Application Data

[63] Continuation of Ser. No. 303,869, Sep. 9, 1994, abandoned.

[51] Int. Cl.⁶ .................................................. H04J 12/28
[52] U.S. Cl. ........................ 370/364; 420/445; 420/463; 420/401
[58] Field of Search ................................. 370/218, 244, 370/245, 250, 400, 401, 402, 420, 445, 457, 463, 360, 361, 362, 364; 340/825.89; 371/11.1, 11.2

[56] References Cited

U.S. PATENT DOCUMENTS

| | | | |
|---|---|---|---|
| 5,177,737 | 1/1993 | Daudelin et al. | 370/364 |
| 5,317,565 | 5/1994 | Crouse et al. | 370/354 |
| 5,345,447 | 9/1994 | Noel | 370/362 |

*Primary Examiner*—Benedict V. Safourek
*Assistant Examiner*—Rickey Ngo
*Attorney, Agent, or Firm*—Meltzer, Lippe, Goldstein, et al.

[57] ABSTRACT

An arrangement for interconnecting groups of users into collision domains in a Local Area Network such as an Ethernet comprises a plurality of repeater groups, with each repeater group being connected to a group of user stations. The arrangement also comprises an electronically reconfigurable switch matrix. The switch matrix comprises a plurality of segment lines (or other transmission media) each of which is used to form one collision domain or Ethernet segment. Switch elements under the control of a microcontroller selectively connect particular repeater groups (and the associated user groups) to particular segment lines to form Ethernet segments, each Ethernet segment being a single collision domain. Internetworking devices such as bridges and routers may also be connected to the switch matrix to interconnect particular collision domains.

9 Claims, 7 Drawing Sheets

RECONFIGURABLE SWITCH MATRIX FOR LOCAL AREA NETWORK

This is a continuation of application Ser. No. 08/303,869, filed Sep. 9, 1994, now abandoned.

FIELD OF THE INVENTION

The present invention relates to an electronically reconfigurable switch matrix for use in a Local Area Network (LAN) such as an Ethernet.

Using the reconfigurable switch matrix of the present invention, different groups of users may be connected together to form collision domains. The reconfigurable switch matrix of the present invention enables the particular collision domain, to which a particular group of users is connected, to be easily altered. A significant advantage of the inventive switch matrix is that additional collision domains may be added without requiring the redesign of the hub. In addition, the inventive switch matrix enables particular collision domains to be connected to each other by an internetworking device such as a packet switch, bridge, or router.

BACKGROUND OF THE INVENTION

A conventional Ethernet is illustrated in FIG. 1. The Ethernet 10 of FIG. 1 comprises a hub 12. A plurality of user groups 14 are connected to the hub 12. For purposes of illustration, eight user groups 14 are shown in FIG. 1. The individual user groups are labeled 14-1, 14-2, 14-3, 14-4, 14-5, 14-6, 14-7 and 14-8. Each of the user groups 14 comprises a plurality of stations 16. Each individual station 16 may be a file server, a workstation, a personal computer (PC), a bridge, a router, or another device which is connected to the Ethernet 10. For example, the bridge 3, interconnects the user groups 14-3 and 14-4.

The hub 12 serves a number of purposes. First, a plurality of groups 14 can be connected by the hub 12 to form a single Ethernet segment or collision domain. For example, the user groups 14-1 and 14-4 can be combined into a first Ethernet segment or collision domain. Similarly, the user groups 14-3 and 14-7 can be combined into a second Ethernet segment or collision domain. A single collision domain has a single shared transmission medium to which all of the user stations in that collision domain have access. Preferably, access by the user stations to the shared transmission medium is governed by the IEEE 802.3 protocol.

In addition, the hub 12 permits the users in a particular collision domain to be connected to the users in a different collision domain via an internetworking device such as a router or bridge or packet switch. For example, the first collision domain (or Ethernet segment) formed by user groups 14-1 and 14-4 is connected to the second collision domain formed by the user groups 14-3 and 14-7 through use of the bridge 3.

The conventional Ethernet hub 12 is illustrated in FIG. 2. The hub 12 comprises a plurality of repeater groups (RG) 22. There is one repeater group 22 connected with the stations 16 in each user group 14. Thus, the repeater groups 22 are labeled 22-1, 22-2, 22-3, 22-4, 22-5, 22-6, 22-7 and 22-8 corresponding to the user groups 14-1, 14-2, 14-3, 14-4, 14-5, 14-6, 14-7 and 14-8, respectively. Each repeater group 22 has one port 18 for each user device (e.g. PC, workstation or file server) connected thereto.

A switch 24-1, 24-2, 24-3, . . . , 24-8 is connected to each repeater group 22-1, 22-2, 22-3 , . . . , 24-8, respectively. The repeater groups 22-1, 22-2, . . . , 22-8 are connected to the switches 24-1, 24-3, . . . , 24-8 by the paths 26-1, 26-2, . . . , 26-8, respectively. Each repeater group 22 and associated switch 24 form a concentrator module, for example, the concentrator module 23-1.

The hub 12 also comprises a backplane 30. The backplane 30 comprises a plurality of backplane segments represented by horizontal lines 32-1, 32-2 and 32-3 in FIG. 2. Each of the switches 24-1, 24-2, . . . , 24-8 is connected to all of the backplane segment lines 32-1, 32-2 and 32-3 by the transmission paths 31-1, 31-2, . . . , 31-8.

Each backplane segment line 32-1, 32-2, 32-3 is used to form one Ethernet segment (or collision domain) which comprises a plurality of the user groups 14. Thus, in the backplane 30 of FIG. 2, up to three Ethernet segments may be formed. There is a segment 1 formed using the backplane segment line 32-1, a segment 2 formed using the backplane segment line 32-2 and a segment 3 formed using the backplane segment line 32-3.

Illustratively, the segment 1 may comprise user groups 14-1 and 14-4. Thus, the switch 24-1 associated with the repeater group 22-1 and the switch 24-4 associated with the repeater group 22-4 are connected to the backplane segment line 32-1. Similarly, the segment 2 may comprise the user group 14-3 and the user group 14-7. Thus, the switch 24-3 and the switch 24-7 are set to connect the repeater groups 22-3 and 22-7 to the backplane segment line 32-2. Similarly, the segment 3 may be formed by connecting two or more user groups to the backplane segment line 32-3.

The problem with the hub 12 of FIG. 2 is that it is not easy to rearrange. In each concentrator module 23, the repeater group 22 has a switch 24 which is 1×N, where N is the number of Ethernet segments which can be formed using the backplane 30. To increase the number of segments from N to N+M, a new backplane is required with N+M (rather than N) backplane segment lines. In addition, a new switch must be provided for each repeater group which can switch the user groups between the N+M backplane segment lines. Specifically, the repeater groups now require switches 24 which are 1×(N+M). Thus, the prior art hub 12 of FIG. 2 has a built in obsolescence. In addition, the prior art hub 12 is not robust with respect to the addition of more user groups. If the number of user groups is increased, it will also be necessary to add repeater groups 22 and switches 24 to account for the additional user groups. Furthermore, in the prior art hub 12, internetworking devices such as bridges and routers are not connected directly to the backplane 30. This means that there is limited flexibility in providing connections between segments.

In view of the foregoing, it is an object of the present invention to provide a switching arrangement for a Local Area Network, such as an Ethernet, which overcomes the shortcomings of the prior art hub.

Specifically, it is an object of the present invention to provide a switching arrangement which is robust with respect to an increase in the number of collision domains (i.e. Ethernet segments), which provides easy access to internetworking devices such or bridges, routers, and sniffers, and which is robust with respect to the addition of user groups.

It is also an object of the invention to provide a switching arrangement for a Local Area Network in which the repeater groups do not have associated switches and in which a switching capability for connecting user groups to form collision domains is provided in an electronically reconfigurable switch matrix.

It is a further object of the invention to provide an electronically reconfigurable switch matrix for use in a Local Area Network such as an Ethernet.

In addition, it is an object of the present invention to provide an electronically reconfigurable switch matrix which provides for the dynamic switching of segments, bridges, and routers, etc., under control of a computer or under manual control by a network supervisor.

SUMMARY OF THE INVENTION

In accordance with an illustrative embodiment of the invention, a switching arrangement for use in a Local Area Network such as an Ethernet comprises one or more repeater groups, with each repeater group being connected to a group of user stations. The switching arrangement also comprises an electronically reconfigurable switch matrix. The switch matrix comprises a plurality of segment lines (or other transmission media), each of which is used to form one collision domain or Ethernet segment. The switch matrix also comprises switch elements which are under the control of a microcontroller. The switch elements selectively connect particular repeater groups (and the associated user groups) to particular segment lines to form Ethernet segments, each Ethernet segment being a single collision domain. Internetworking devices such as bridges and routers may also be connected to the switch matrix segment lines to interconnect particular collision domains.

It is a significant advantage of the inventive switching arrangement that no switching capability is required in the concentrator modules (i.e. no switches need be attached to the repeater groups) in order to combine particular user groups. Instead, the switching capability is provided by the electronically reconfigurable switch matrix. Thus, it is easy to rearrange the collision domains to which particular user groups belong. It is also easy to increase the number of collision domains and the number of user groups, as the redesign of concentrator switches (i.e. switches connecting repeater groups to a backplane) is no longer necessary.

In addition, the reconfigurable switch matrix of the present invention provides unique switch matrix ports which are assigned to bridges, routers, sniffers or other internetwork connection devices so that all collision domains can access these devices.

DETAILED DESCRIPTION OF THE INVENTION

Figure 3:
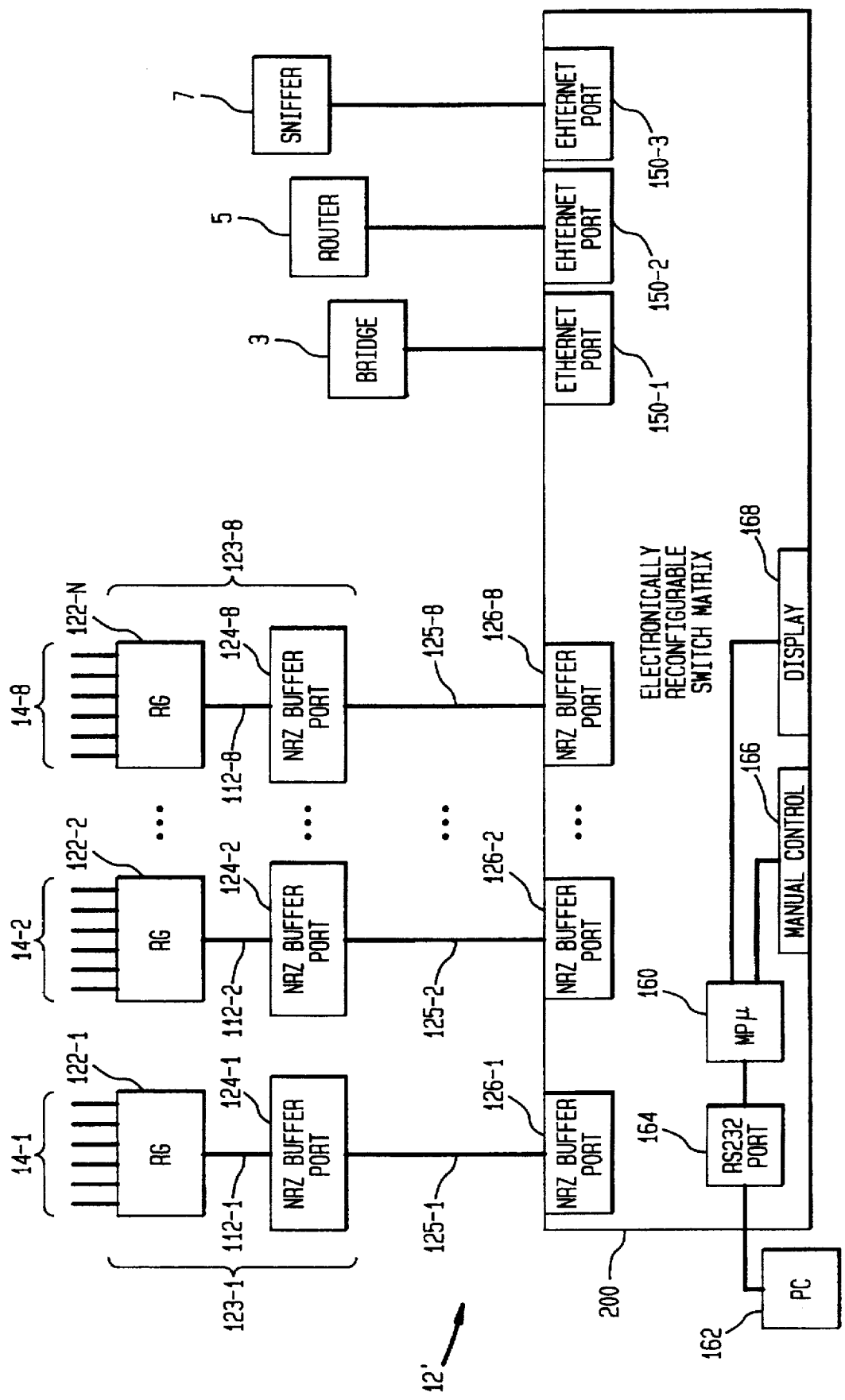
FIG. 3 schematically illustrates a switching arrangement in accordance with an illustrative embodiment of the present invention.

A switching arrangement 12' in accordance with an illustrative embodiment of the present invention is illustrated in FIG. 3. The switching arrangement 12' interconnects the user groups 14-1, 14-2, 14-3, 14-4, 14-5, 14-6, 14-7, 14-8 into one or more separate collision domains also known as Ethernet segments. The switching arrangement 12' is also connected to one or more internetworking devices such as a bridge 3, router 5, or sniffer 7 to permit communication between the separate collision domains.

Figure 5:
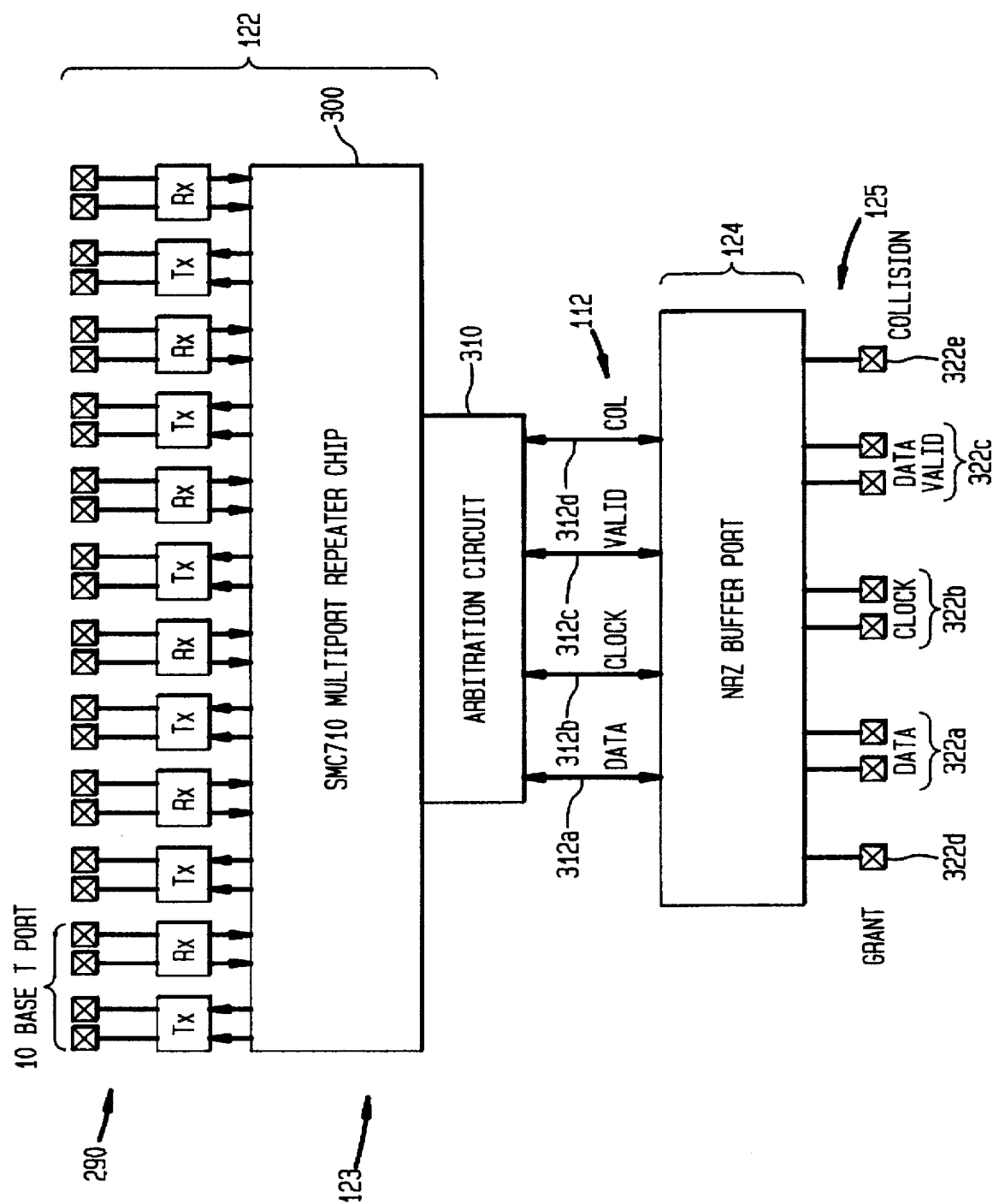
FIG. 5 schematically illustrates a concentrator module for use in the switching arrangement of FIG. 3.
Figure 6:
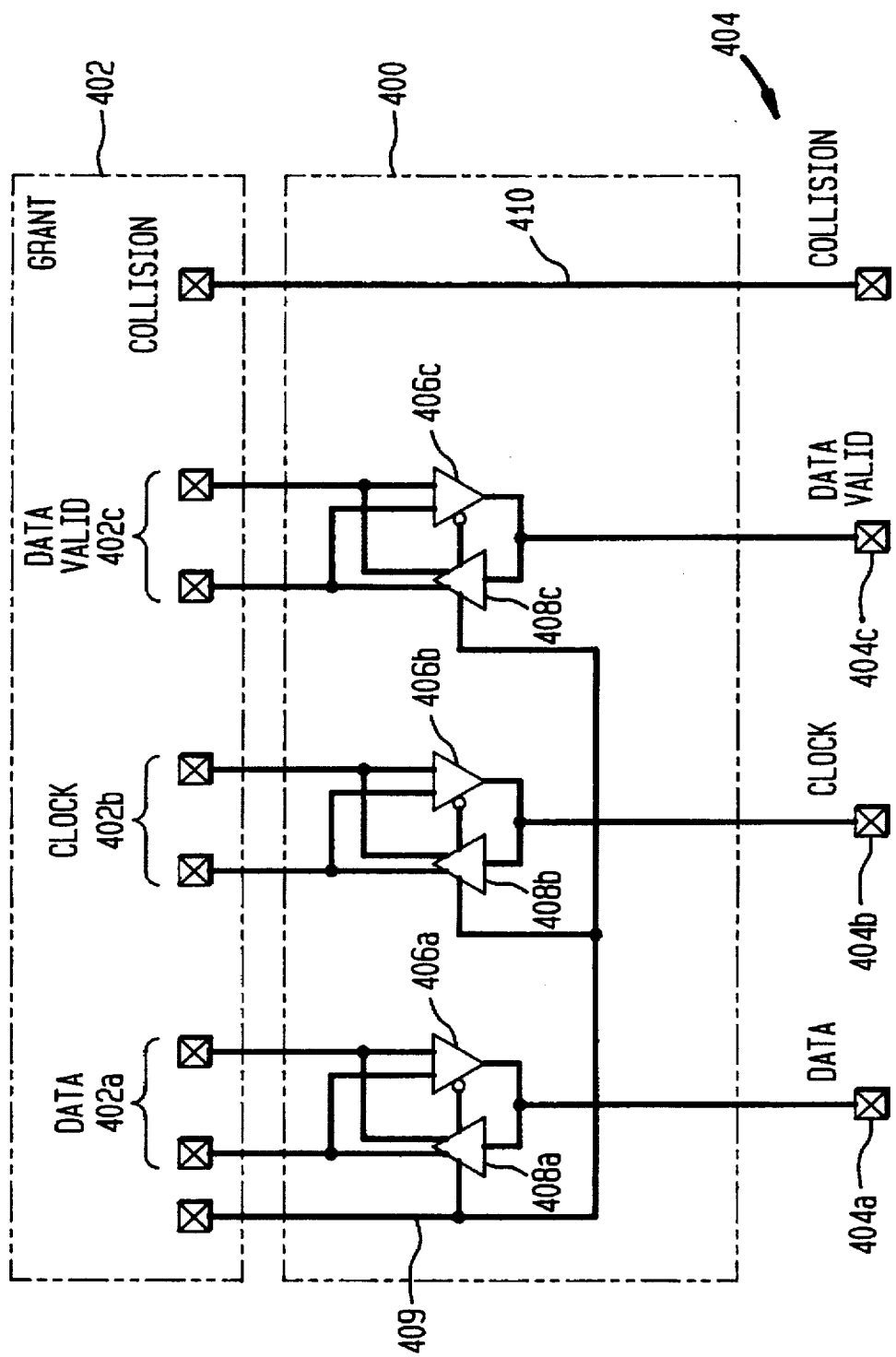
FIG. 6 schematically illustrates an NRZ buffer port for use in the switching arrangement of FIG. 3.

The switching arrangement 12' comprises a plurality of repeater groups 122. There is one repeater group 122 associated with each user group 14. The internal structure of a repeater group 22 is shown in FIG. 5 and is described below. Each of the repeater groups, 122-1 through 122-8, is connected to a corresponding NRZ buffer port, 124-1 through 124-8 by a transmission path 112-1 through 112-8. An NRZ buffer port 124 is shown in FIG. 6 and is described below. Each repeater group 122 and associated NRZ buffer port 124 form a concentrator module such as the concentrator modules 123-1 and 123-8.

The switching arrangement 12' also includes a reconfigurable electronic switch matrix 200. The NRZ buffer ports, 124-1 through 124-8, are connected to the reconfigurable electronic switch matrix 200 via the NRZ buffer ports 126-1, 126-2, . . . , 126-8. Signals are transmitted between the NRZ buffer ports 124 and the NRZ ports 126 in analog differential NRZ (Non-Return-to-Zero) form. This signal form is discussed below. However, at this point it should be noted that each of the transmission paths 125 between an NRZ buffer port 124 and an NRZ buffer port 126 actually includes six distinct transmission paths for the transmission of analog differential NRZ signals. Also connected to the reconfigurable electronic switch matrix 200 are a plurality of Ethernet ports 150-1, 150-2, 150-3. The ports 150 may be 10BASE-T ports, 10BASE-2 ports, 10BASE-F ports or other Ethernet ports. The ports 150 may each be connected to a bridge (e.g., bridge 3) or router (e.g., router 5) or other internetworking device (e.g., sniffer 7) for interconnecting Ethernet segments. Alternatively, one or more of the ports 150 may be connected to a file server or other device such as a repeater group. It is a significant advantage of the invention that two kinds of ports (analog NRZ buffer ports 126 and Ethernet ports 150) can be supported by the switch matrix 200.

Figure 7:
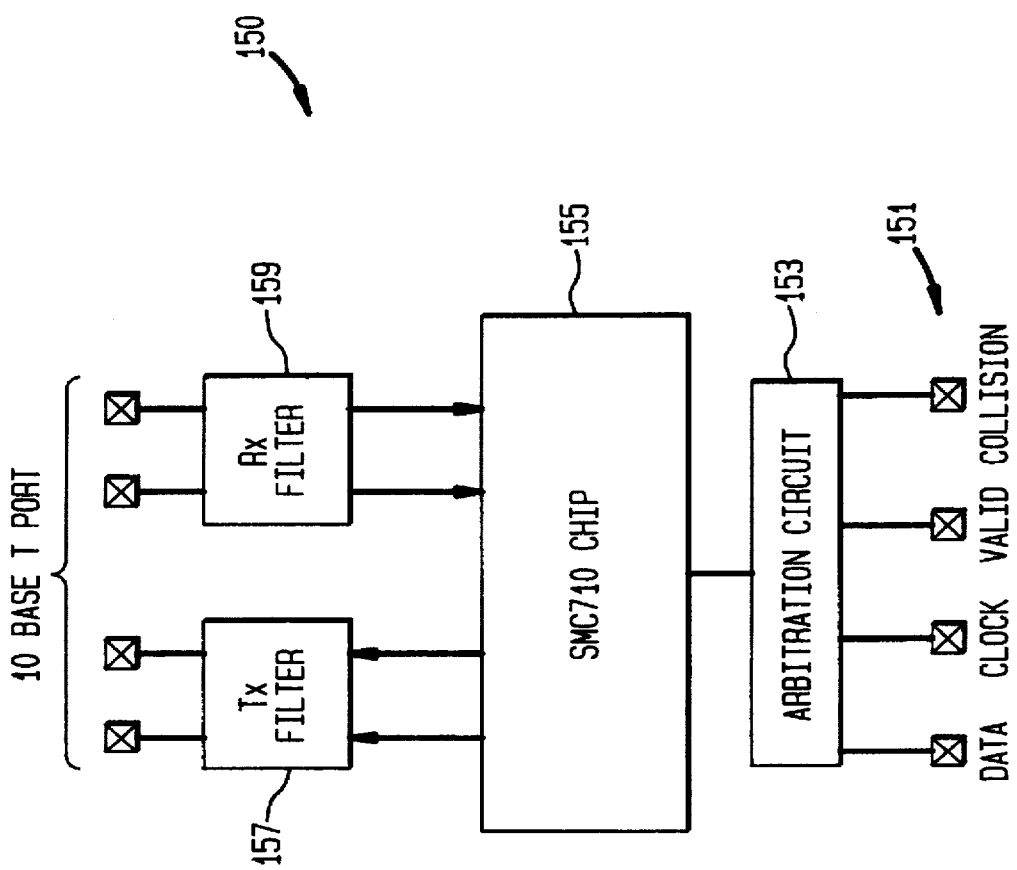
FIG. 7 schematically illustrates a 10BASE-T Ethernet port for use in the switching arrangement of FIG. 3.

The structure of the switch matrix 200 is shown in greater detail in FIG. 4 and is described below. The structure of an Ethernet port 150 is shown in FIG. 7 and is described below.

The switch matrix 200 is controlled by the microcontroller 160 which, for example, is an Intel 8051 controller.

A network manager can input information into the controller 160 about how the switch matrix 200 is to be configured via the I/O device 162 (which may be a Personal Computer) and the RS232 port 164. An input device 166 for the manual control of switch elements in the backplane 200 is connected to the controller 160. The I/O device 162 can be used to disable the manual control device 166. A display 168 is also connected to the controller 160 to show the configuration of the switch matrix 200. Depending on the particular configuration of the switch matrix 200, different ones of the user groups 14 are combined into Ethernet segments. In addition, particular segments are interconnected to each other using bridges and/or routers connected to the ports 150.

Figure 4:
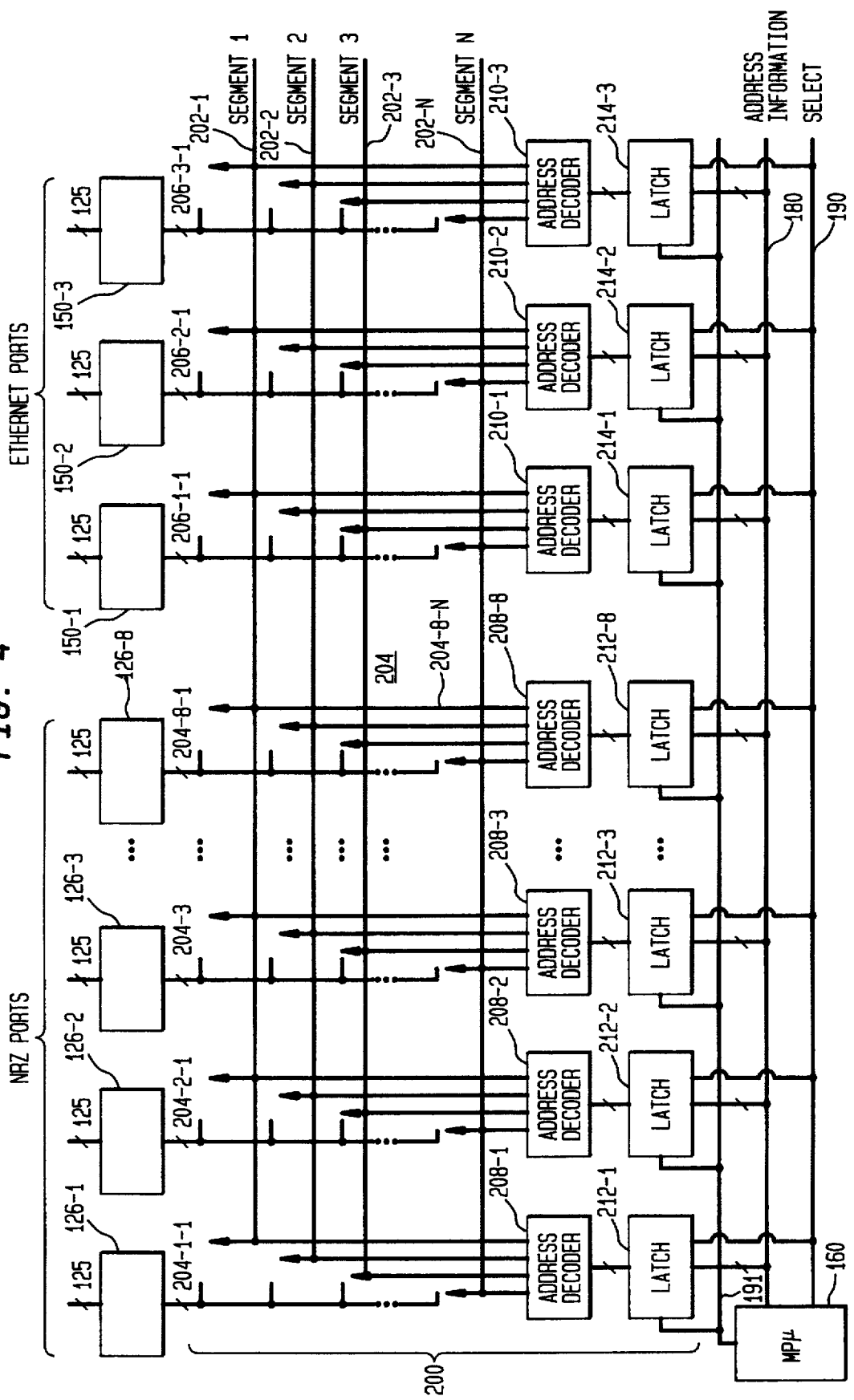
FIG. 4 shows an electronically reconfigurable backplane used in the inventive switching arrangement of FIG. 3 in greater detail.

FIG. 4 shows the backplane 200 in greater detail. The backplane 200 comprises N backplane segment lines (or other transmission media) 202-1, 202-2, 202-3, . . . , 202-N. Each backplane segment line 202-1, 202-2, 202-3, . . . , 202-N is used to connect a plurality of user groups into a single collision domain or Ethernet segment. The segments are labeled segment 1, segment 2, segment 3, ..., segment N corresponding to the backplane segment lines 202-1, 202-2, 202-3, ..., 202-N.

A sub-array of switch elements 204 selectively connects the NRZ ports 126-1, ..., 126-8 to the backplane segment lines 202-1, 202-2, 202-3, ..., 202-N. Each switch element in the sub-array 204 is labeled 204-i-j, where i indicates the number of the NRZ port (i=1, 2, 3, ..., 8) and j indicates the number of the backplane segment line (j=1, 2, ..., N)

Another sub-array of switches 206 selectively connects the Ethernet ports 150-1, 150-2, to 150-3 to the backplane segment lines 202-1, 202-2, ..., 202-N. Each switch element in the array 206 is labeled 206-i-j where i=1, 2, 3 indicates the Ethernet port and j=1, 2, 3, ..., N indicates the segment line. It should be noted that within the backplane 200 (i.e. on the segment lines 202 and within the switch arrays 204, 206) signals propagate in a digital NRZ form. This signal form is described in greater detail below. However, it should be noted that four distinct transmission paths are required to transmit a digital NRZ signal. Thus the transmission paths in the backplane 200, such as the segment lines 202, actually comprise four distinct transmission paths. The NRZ buffer ports 126 convert between the analog differential NRZ signals transmitted between the NRZ ports 124 and the NRZ ports 126 via the transmission paths 125 (see FIG. 3) and the digital NRZ signals which are transmitted within the switch matrix 200.

Associated with each vertical column of switches 204-1-j, 204-2-j, ..., 204-8-j, 206-1-j, 206-2-j, 206-3-j, j=1, 2, ..., N, is an address decoder 208-1, 208-2, ..., 208-8, 210-1, 210-2 and 210-3 and a latch 212-1, 212-2, ..., 212-8, 214-1, 214-2, 214-3.

The controller 160 outputs address information on the address information bus 180. Latch select information is outputted by the controller 160 on the select bus 190. The controller 160 also outputs a write enable signal W which is transmitted via line 191 to the latches 212, 214 to enable address data to be written therein. Address information outputted by the controller 160 on the address information bus 180 is written into of each latch 212, 214 individually as indicated by the select signals on the select bus 190. The address information in the latches 212, 214 is decoded by the corresponding address decoders 208, 210. The address decoders 208, 210 than actuate particular switch elements in the sub-arrays 204, 206 so that particular NRZ buffer ports 126 and particular Ethernet ports 150 are connected to particular backplane segment lines 202.

In this manner, user groups are connected to form Ethernet segments. The particular segment (or collision domain) a user group belongs to may easily be altered, simply by reconfiguring the switch arrays 204, 206. In addition, by connecting one of the Ethernet ports 150 to particular segment lines 202, different collision domains may be interconnected by a bridge or router connected to the Ethernet port 150.

Figure 1:
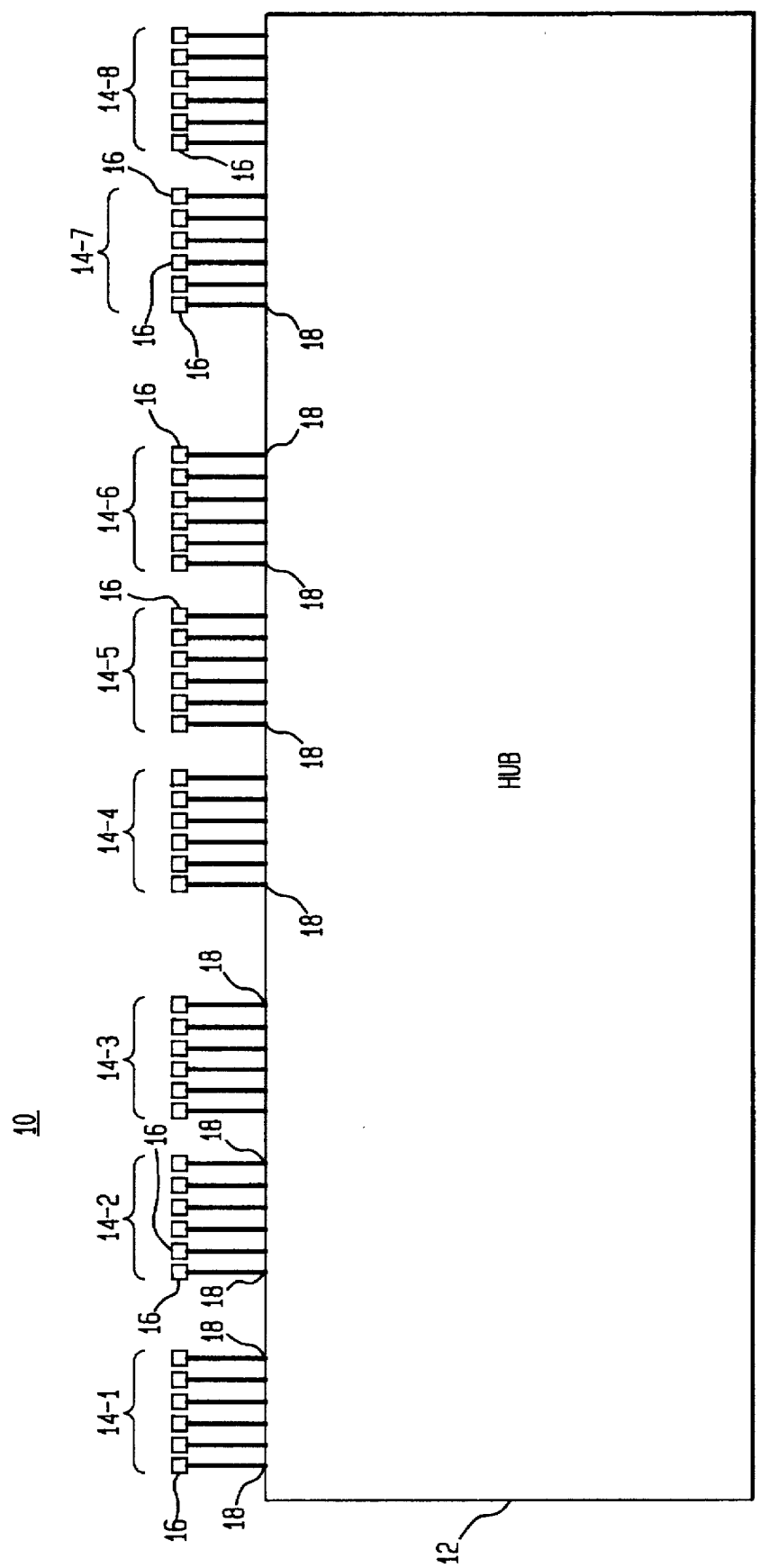
FIG. 1 schematically illustrates a conventional Local Area Network which is an Ethernet.
Figure 2:
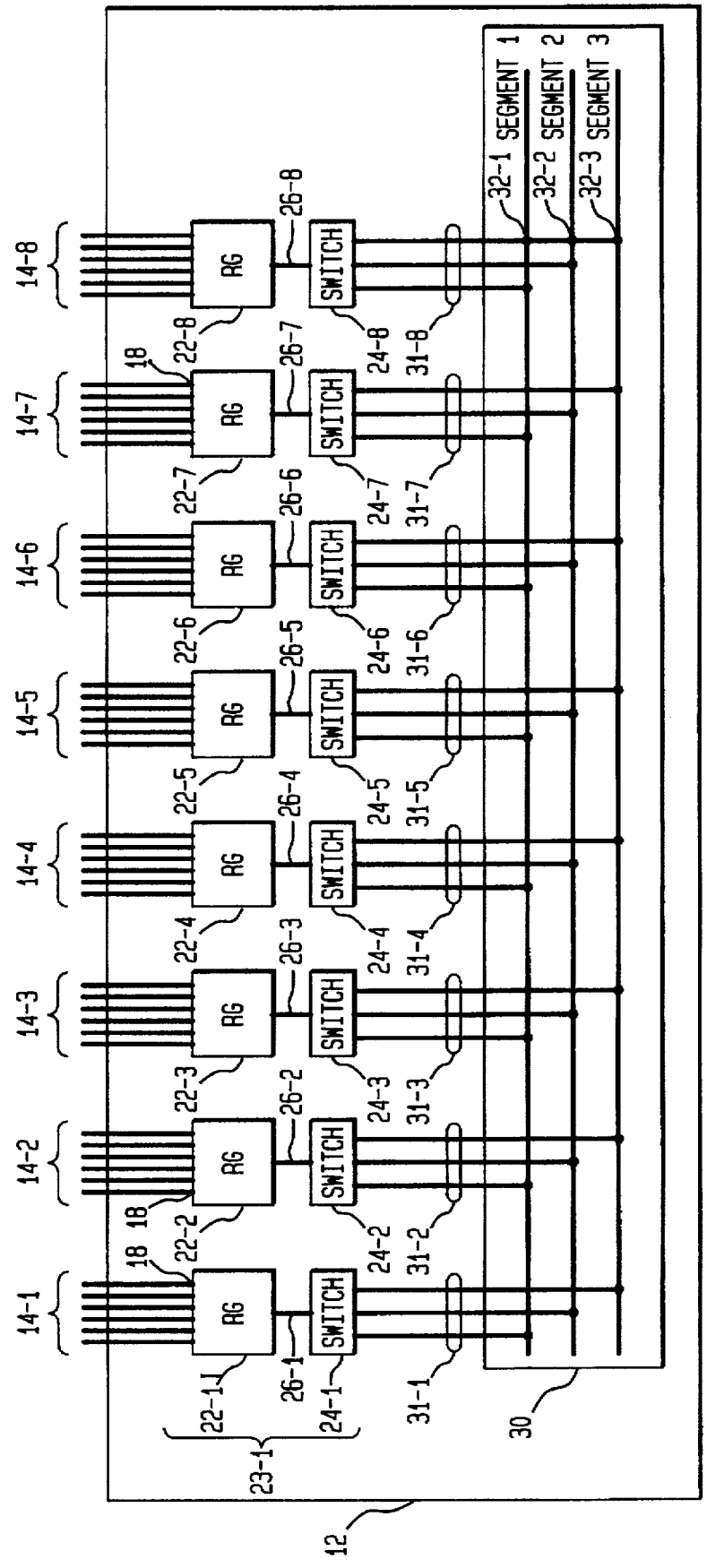
FIG. 2 schematically illustrates a conventional hub for use in the network of FIG. 1.

A concentrator module 123 (see FIG. 3) is shown in greater detail in FIG. 5. The concentrator module 123 comprises the repeater group 122 and the NRZ buffer port 124 which are interconnected by the transmission path 112. It is significant that the concentrator module 123 includes no switch (such as switch 24 of FIG. 2). As indicated above in connection with FIG. 3, the inventive switching arrangement 12' includes one repeater group 122 for each user group 14. The repeater group 122 includes, for example, six 10BASE-T ports 290, each of which is connected to a user station 16 (see FIG. 1). Each 10BASE-T port 290 comprises a transmitting filter (Tx) via which information is transmitted to a user station and a receiving filter (Rx) via which information is received from a user station. The 10BASE-T ports 290 are all connected to a multiport repeater chip 300 which is, for example, an SMC 710 chip available from Standard Microsystems Corporation. The multiport repeater chip 300 provides digital NRZ signals (Data, Clock, Data Valid, and Collision) for expansion of a segment without repeater hops. The arbitration circuit 310 provides direction control and collision handling for the multiport repeater chip 300.

An NRZ buffer port 124 is connected to the arbitration circuit 310 via the transmission path 112. The NRZ buffer port 124 is used to convert between digital NRZ signals on the transmission path 112 and analog differential NRZ signals on the transmission path 125. The digital NRZ transmission path 112 includes single bidirectional lines 312a, b, c and d for the data, clock, data valid and collision signals. The transmission path 125 for the analog differential NRZ signal includes the bidirectional differential lines 322a, 322b, and 322c for the data, clock, and data valid signals as well as single bidirectional lines 322d and 322e for grant and collision signals. The analog differential NRZ transmission path 125 of the NRZ buffer port 124 is connected to a corresponding analog NRZ buffer port 126 associated with the switch matrix (see FIG. 3 and FIG. 4).

An NRZ buffer port 400 is illustrated in greater detail in FIG. 6. The NRZ buffer port 400 of FIG. 6 converts between analog differential NRZ signals on the lines 402 and digital NRZ signals on the lines 404. The NRZ buffer port 400 of FIG. 6 may be used to implement the NRZ buffer ports 124 and 126 of FIG. 3 and FIG. 4. Specifically, there is conversion between bidirectional differential data, clock, and data valid signals on the bidirectional differential lines 402a, 402b, 402c, and the digital NRZ data, clock and data valid signals on the lines 404a, 404b, 404c. To accomplish the conversion, three pairs of tristate devices are provided. The tristate devices 406a, 408a convert the data signal. The tristate devices 406b, 408b convert the clock signal. The tristate devices 406c, 408c convert the data valid signal.

The tristate devices 406a, 408a; 406b, 408b; 406c, 408c are enabled by a grant signal on line 409. The collision signal 410 is unaffected by the NRZ buffer 400. The collision signal is used to indicate that more than one device is attempting to gain access to a particular collision domain.

An exemplary implementation of an Ethernet port 150 is shown in FIG. 7. Illustratively, the port 150 is a 10BASE-T port but can be any type of Ethernet connection. The Ethernet port 150 interfaces with the switch matrix 200 via the lines 151 which carry digital NRZ signals. The port 150 includes a conventional arbitration circuit 153 and a repeater chip 155 which may be a SMC 710 chip. An external device such as a bridge or router (or packet switch, repeater group, or file server) connects to the port 150 via the transmit filter 157 and receive filter 159.

In short, a unique switching arrangement for a Local Area Network such as an Ethernet has been disclosed. The switching arrangement includes an electronically reconfigurable switch matrix. As a result, the concentrator modules in the Local Area Network include no switches. Thus, it is relatively easy to rearrange the collision domains to which particular user groups belong. It is also particularly easy to increase the number of collision domains supported by the switching arrangement and the number of user groups connected to the switching arrangement. In addition, it is an advantageous feature of the switching arrangement that the switch matrix supports two kinds of ports, NRZ buffer ports and conventional Ethernet ports. The NRZ buffer ports enable a single segment (collision domain) environment for multiple connections to reduce the need for repeater hops. Finally, the above-described embodiments of the invention are intended to be illustrative only. Numerous alternative embodiments may be devised by those skilled in the art without departing from the scope of the claims.

We claim:

1. A reconfigurable switch matrix for use in a hub of a network comprising:

a plurality of distinct transmission media, a plurality of switch matrix ports, each switch matrix port being selectively connectable to each of said transmission media for transmitting and receiving data to and from any one of the selected transmission media, respectively, an array of switch elements, each switch element, when actuated, providing a connection which enables a particular one of said ports to couple signals onto and couple signals off of a particular one of said transmission media, and a controller for electronically actuating selected ones of said switch elements for providing a connection between selected ones of said ports and selected ones of said transmission media.

2. The switch matrix of claim 1 wherein each of said transmission media corresponds to a single collision domain in said network and the specific ports connected to a specific one of said transmission media forming a specific collision domain in said network.

3. The switch matrix of claim 1 wherein each of said transmission media includes four distinct transmission paths for transmitting digital NRZ signals.

4. The switch matrix of claim 3 wherein one or more of said switch matrix ports are NRZ buffer ports which convert between analog differential NRZ signals and digital NRZ signals used within said switch matrix on said transmission media.

5. The switch matrix of claim 3 wherein one or more of said switch matrix ports are NRZ buffer ports which convert between analog differential NRZ signals and digital NRZ signals used within said switch matrix on said transmission media and one or more of said switch matrix ports are Ethernet ports.

6. The switch matrix of claim 4 wherein each of said NRZ buffer ports is connected to a concentrator module, each of said concentrator modules comprising a repeater group having one or more Ethernet ports and an NRZ buffer port connected to a corresponding NRZ buffer port of said switch matrix.

7. The switch matrix of claim 2 wherein one or more of said switch matrix ports are Ethernet ports, each Ethernet port comprising a receive filter for receiving data from a station, a transmit filter for transmitting data to a station and a repeater circuit.

8. The switch matrix of claim 1 which said switch matrix includes an address decoder associated with a group of said switch elements, said address decoder receiving address information from said controller and decoding said address information for generating signals to actuate one or more switch elements in said group.

9. An arrangement for use in a communications network comprising at least one concentrator module each of which includes a repeater group and an NRZ buffer port, and a reconfigurable switch matrix comprising:

at least one NRZ buffer port which transmits differential analog NRZ signals to and receives differential analog NRZ signals from said NRZ buffer port in said concentrator module, at least one Ethernet port, a plurality of transmission media each corresponding to a collision domain in said network, an array of switch elements, each switch element, when actuated, providing a connection between a particular one of said ports and a particular one of said transmission media which enables the particular port to couple signals onto and off of the particular one of said transmission media, and a controller for an actuating selected ones of said switch elements to form one or more distinct collision domains in said network.

* * * * *